(12) United States Patent
Kumagai et al.

(10) Patent No.: US 7,433,028 B2
(45) Date of Patent: Oct. 7, 2008

(54) LASER SURVEYING INSTRUMENT

(75) Inventors: Kaoru Kumagai, Itabashi-ku (JP);
Jun-ichi Kodaira, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/544,115

(22) Filed: Oct. 6, 2006

(65) Prior Publication Data
US 2007/0103672 A1     May 10, 2007

(30) Foreign Application Priority Data
Nov. 8, 2005    (JP)    ............... 2005-323906

(51) Int. Cl.
*G01B 11/26* (2006.01)
(52) U.S. Cl. .................................. 356/139.03
(58) Field of Classification Search . 356/139.01–139.1, 356/3.01–3.15, 4.01–4.1, 5.01–5.15, 6–22, 356/128, 128.5, 139.03
See application file for complete search history.

(56) References Cited
U.S. PATENT DOCUMENTS
6,248,989 B1 * 6/2001 Ohishi ........................ 250/205

6,493,067 B1 * 12/2002 Kodaira et al. ............. 356/4.08

FOREIGN PATENT DOCUMENTS
JP    6-26861    2/1994
JP    2001-280964    10/2001

* cited by examiner

*Primary Examiner*—Thomas H. Tarcza
*Assistant Examiner*—Luke D Ratcliffe
(74) *Attorney, Agent, or Firm*—Nields & Lemack

(57) ABSTRACT

A laser surveying instrument, comprising a laser projector for projecting a laser beam by rotary irradiation and designed as tiltable, a tilting unit for tilting the laser projector, a rotating unit for integrally rotating the tilting unit and the laser projector in horizontal direction, a tilt setting unit for tilting the laser projector with respect to the rotating unit and for setting a target tilt angle, a tilt angle detector for detecting tilting of the laser projector, tilt sensors provided on the tilt setting unit in two directions perpendicularly crossing and for detecting horizontal direction, a horizontal angle detector for detecting horizontal rotation angle of the rotating unit, and an arithmetic control unit for controlling rotation angle of the rotating unit based on detection results of the tilt sensors and based on detection results of the horizontal angle detector.

4 Claims, 5 Drawing Sheets

LASER SURVEYING INSTRUMENT

BACKGROUND OF THE INVENTION

The present invention relates to a laser surveying instrument for forming a horizontal plane or a tilted plane as desired by projecting a laser beam by rotary irradiation.

Reference lines and reference planes are indispensable in the execution of construction work and civil engineering work, and the reference line and plane are formed as the result of projection of the laser beam by rotary irradiation. In the past, a laser surveying instrument has been known, which can form a horizontal reference plane and also can form a tilt reference plane with a desired tilt angle, and such surveying instrument is described in JP-A-6-26861 or in JP-A-2001-280964.

The laser surveying instrument 10 as disclosed in JP-A-6-26861 comprises, as shown in FIG. 5, a projector 1 for projecting a laser beam 13 by rotary irradiation and tiltable in two directions, 2 sets of tilting mechanisms 2 for tilting the projector 1 in two directions, 2 sets of fixed tilt detectors 4 provided on a plane 3 crossing perpendicularly the axis of the projector 1 and for detecting tiltings in two directions, 2 sets of tiltable tilt detectors 6 crossing the axis of the projector 1 and arranged on a tiltable plane 5 which is enabled to tilt in two directions, and 2 sets of tilt setting mechanisms 7 for tilting the tiltable plane 5 in two directions.

In case that a horizontal plane is to be formed, the tiltable tilt detector 6 is aligned with the fixed tilt detector 4 so that the fixed tilt detector 4 indicates horizontal direction and the tiltable tilt detector 6 indicates horizontal direction. The projector 1 is leveled so that the fixed tilt detector 4 and the tiltable tilt detector 6 detect horizontal direction, and a horizontal reference plane is obtained by projecting the laser beam 13 from the projector 1 by rotary irradiation.

In case that a tilt reference plane is to be formed, the tiltable tilt detector 6 is tilted by the tilt setting mechanism 7 based on the fixed tilt detector 4 as a reference. Tilting of the tiltable tilt detector 6 can be attained when the tilt setting mechanism 7 gives mechanical displacement to the tiltable plane 5.

By leveling the projector 1 by means of the tilting mechanism 2 in such manner that the tiltable tilt detector 6 which was tilted indicates horizontal direction, the projector 1 can be tilted in a direction as desired. And by projecting the laser beam 13 from the projector 1 by rotary irradiation, a tilt reference plane can be obtained.

The laser surveying instrument 15 disclosed in JP-A-2001-280964 comprises, as shown in FIG. 6, a projector 1 for projecting a laser beam 13 by rotary irradiation and tiltable in two directions, 2 sets of tilting mechanisms 2 for tilting the projector 1 in two directions, a first tilt setting unit 8a provided on the projector 1 and capable to set a tilt angle of a first direction with respect to the projector 1, and a second tilt setting unit 8b (not shown) provided on the projector 1 and capable to set a tilt angle of a second direction perpendicularly crossing the first direction with respect to the projector 1.

The first tilt setting unit 8a comprises a first tilt angle detector 9a, first tilt sensors 11a and 12a, and a first tilt setting mechanism 7a for tilting the first tilt angle detector 9a. Also, the second tilt setting unit 8b comprises a second tilt angle detector 9b (not shown), second tilt sensors 11b and 12b (both not shown), and a second tilt setting mechanism 7b (not shown) for tilting the second tilt angle detector 9b.

In case that tilt setting is performed by the laser surveying instrument 15, an angle detected by the first tilt angle detector 9a is tilted in opposite direction with the same numerical value as the set angle by the tilt setting mechanism 7a. Next, the projector 1 is tilted by the tilt mechanism 2 so that the first tilt sensor 11a detects the horizontal direction. By setting a condition where the first tilt sensor 11a detects horizontal direction, the setting of the tilted plane is completed.

However, in the laser surveying instrument of the former case, the tilt setting mechanisms are needed respectively for two tilting directions, and the mechanism has complicated structure. Further, the accuracy of the setting of the tilt angle depends on mechanical accuracy of the mechanical components. There is a problem that the accuracy of the setting angle may be affected, when mechanical components are worn out and the like as time elapses.

In the laser surveying instrument of the latter case, the setting of the tilt angle is performed by a tilt angle detector. As a result, the accuracy of the setting of the tilt angle depends on the mechanical accuracy of the mechanical components. And the decrease of the setting accuracy due to wearing and the like can be avoided. While problems lie in that complicated mechanism is required because tilt setting mechanisms are needed for two tilting directions respectively.

SUMMARY OF THE INVENTION

It is an object of the present invention to provide a laser surveying instrument, which is simple in construction and which can set and tilt the laser reference plane as desired and can attain high tilt setting accuracy and high reproducibility.

To attain the above object, the laser surveying instrument according to the present invention comprising a laser projector for projecting a laser beam by rotary irradiation and designed as tiltable, a tilting unit for tilting the laser projector, a rotating unit for integrally rotating the tilting unit and the laser projector in horizontal direction, a tilt setting unit for tilting the laser projector with respect to the rotating unit and for setting a target tilt angle, a tilt angle detector for detecting tilting of the laser projector, tilt sensors provided on the tilt setting unit in two directions perpendicularly crossing and for detecting horizontal direction, a horizontal angle detector for detecting horizontal rotation angle of the rotating unit, and an arithmetic control unit for controlling rotation angle of the rotating unit based on detection results of the tilt sensors and based on detection results of the horizontal angle detector. Also, the present invention provides the laser surveying instrument as described above, wherein the tilting unit comprises an X-direction tilting unit and a Y-direction tilting unit running perpendicularly to each other, and wherein the tilting unit levels the laser projector in vertical direction by leveling the laser projector in such manner that the tilt sensors detect horizontal direction in the condition that the tilt setting unit is at a reference position. Further, the present invention provides the laser surveying instrument as described above, wherein tilting arms are extended in horizontal direction from the laser projector, the tilting unit tilts the laser projector via the tilting arms, and the tilt angle detector detects tilting of the tilting arms. Also, the present invention provides the laser surveying instrument as described above, wherein the tilt angle detector comprises an absolute pattern moving up or down to follow the movement of the tilting arms and comprises a position detector fixedly provided to face to the absolute pattern, and a tilt angle from the reference position of the tilting arms is detected by detecting the absolute pattern by the position detector.

According to the present invention, a laser surveying instrument is provided, which comprises a laser projector for projecting a laser beam by rotary irradiation and designed as tiltable, a tilting unit for tilting the laser projector, a rotating unit for integrally rotating the tilting unit and the laser projector in horizontal direction, a tilt setting unit for tilting the laser projector with respect to the rotating unit and for setting a target tilt angle, a tilt angle detector for detecting tilting of the laser projector, tilt sensors provided on the tilt setting unit in two directions perpendicularly crossing and for detecting horizontal direction, a horizontal angle detector for detecting horizontal rotation angle of the rotating unit, and an arithmetic control unit for controlling rotation angle of the rotating unit based on detection results of the tilt sensors and based on detection results of the horizontal angle detector. As a result, a tilt reference plane can be set by a laser surveying instrument designed in simple construction.

BRIEF DESCRIPTION OF THE DRAWINGS

FIG. 3 represents drawings each explaining a linear sensor to be used in the embodiment of the present invention.

DETAILED DESCRIPTION OF THE PREFERRED EMBODIMENT

Detailed description will be given below on the best mode for carrying out the present invention referring to the attached drawings.

Figure 1:
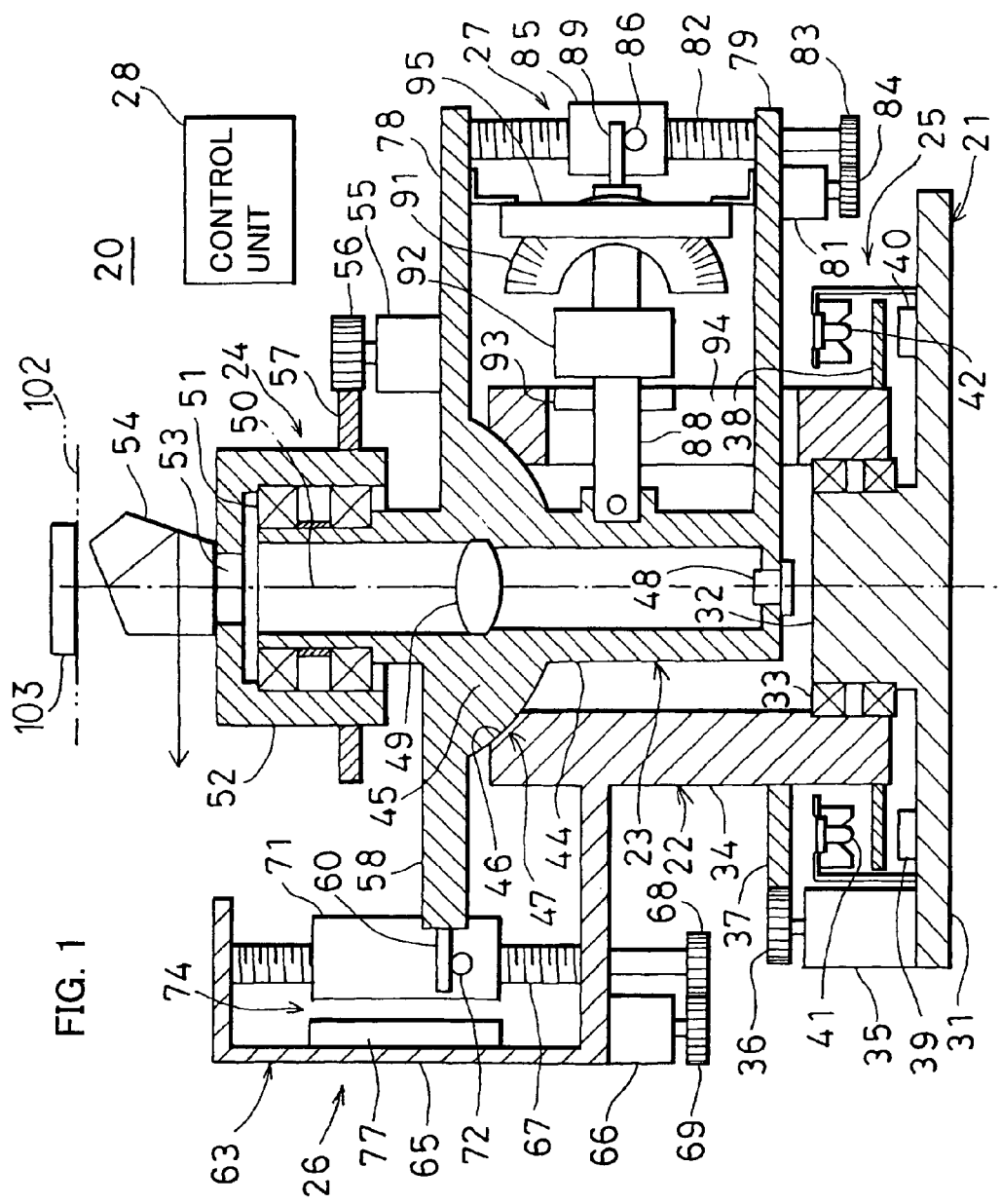
FIG. 1 is a schematical cross-sectional view of an embodiment of the present invention.

Now, description will be given on a laser surveying instrument 20 of the present invention by referring to FIG. 1 and FIG. 2.

The laser surveying instrument 20 primarily comprises a base unit 21, a rotating unit 22 rotatably mounted on the base unit 21, a laser projector 23 tiltably mounted on the rotating unit 22, a rotary irradiation unit 24 rotatably provided on upper end of the laser projector 23, a horizontal angle detector 25 arranged between the base unit 21 and the rotating unit 22, a tilting unit 26 provided between the rotating unit 22 and the laser projector 23, a tilt setting unit 27 provided on the laser projector 23, a control unit 28, and an operation unit 30. Mechanical components unit including the rotating unit 22, the laser projector 23, the rotary irradiation unit 24, the tilt setting unit 27, etc. are accommodated in a case 102, and the case 102 can be rotated integrally with the mechanical components unit. A coarse sight 103 is provided on an upper surface of the case 102 so that a tilting direction can be collimated by the coarse sight 103. The operation unit 30 is integrated with the case 102 or the operation unit 30 is arranged separately so that the operation unit 30 can be remotely controlled, and comprises operation buttons, a display unit, etc.

Detailed description will be given below on the composition of the laser surveying instrument.

The base unit 21 comprises a base 31 to support the laser surveying instrument 20, and a support shaft 32 is protruded on the base 31. The rotating unit 22 has a hollow rotation shaft 34, and the support shaft 32 is internally engaged with the rotation shaft 34 via a bearing 33. The rotation shaft 34 is rotatably freely supported by the support shaft 32.

A revolving motor 35 is mounted on the base 31, and a revolving driving gear 36 is attached to an output shaft of the revolving motor 35. A revolving driven gear 37 is provided on the rotation shaft 34. The revolving driven gear 37 is geared with the revolving driving gear 36, and the rotation shaft 34 is revolved by the revolving motor 35.

Now, description will be given on the horizontal angle detector 25. In the present embodiment, an absolute encoder with a composition as given below is used as the horizontal angel detector 25. On a lower end of the rotation shaft 34, a horizontal angle protractor 38 is provided. Horizontal angle detectors 39 and 40 are provided on the base 31 so as to dispose at a position opposite to the horizontal angle protractor 38. The horizontal angle detectors 39 and 40 are arranged on the same circumference at the positions separated from each other by an angle of 180°. Two light emitters 41 and 42 are arranged to face to the horizontal angle detectors 39 and 40 respectively, and lights emitted from each of the light emitters 41 and 42 are received by the horizontal angle detectors 39 and 40 respectively via the horizontal angle protractor 38.

The horizontal angle detector 39 and the horizontal angle detector 40 are at positions separated from each other by an angle of 180°. Error caused by decentering can be offset as an average value is obtained from the results of detection of both horizontal angle detector, and angle detection can be performed with high accuracy.

An angle scale is marked on the horizontal angle protractor 38, and the angle scale is changed with a predetermined cycle. The angle scale is an absolute pattern and the absolute pattern enable to achieve high resolution and high accuracy by detecting the scale and cyclic change. For instance, a light emitting diode is used as each of the light emitters 41 and 42. As each of the horizontal angle detectors 39 and 40, a device such as CCD is used so that it can detect a light and also can recognize a pattern.

The laser projector 23 has a hollow body tube 44. A semi-spherical unit 45 is formed between upper half and lower half of the body tube 44, and the lower half is inserted in the hollow portion of the rotation shaft 34. On an upper end of the rotation shaft 34, a spherical recess 46 is formed. The semi-spherical unit 45 is engaged with the spherical recess 46 and the semi-spherical unit 45 and the spherical recess 46 make up together a spherical receiving seat 47, and the body tube 44 is tiltably in arbitrary direction supported on the rotation shaft 34 via the spherical receiving seat 47.

A laser light source 48 and a condenser lens 49 are provided within the body tube 44. An optical axis 50 of the laser light source 48 and the condenser lens 49 is aligned with the axis of the body tube 44, and the laser beam is projected along the optical axis 50 as parallel luminous fluxes.

On an upper end of the body tube 44, a rotating body 52 is rotatably and externally engaged via a bearing 51. On the rotating body 52, an aperture 53 coaxial with the optical axis 50 is drilled. On an upper surface of the rotating body 52, a pentagonal prism 54 is mounted on the optical axis 50. The pentagonal prism 54 deflects the laser beam emitted from the laser light source 48 in perpendicular direction (i.e. in horizontal direction) and projects the laser beam.

A scanning motor 55 is provided on the body tube 44. A scanning driving gear 56 is engaged with output shaft of the scanning motor 55, and the scanning driving gear 56 is geared with a scanning driven gear 57, which is provided on the rotating body 52.

From the body tube 44, tilting arms 58 and 59 (only one of them is not shown in the figure) are extended in two horizontal directions running perpendicularly to each other. At a forward end of each of the tilting arms 58 and 59, engaging pins 60 and 61 (one of them is not shown in the figure) are protruded, and the tilting arms 58 and 59 are connected with the tilting unit 26 via the engaging pins 60 and 61 respectively. An axis (X-axis) of the tilting arm 58 is aligned with collimating direction of the coarse sight 103.

The tilting unit 26 comprises an X-axis tilting mechanism 63 and a Y-axis tilting mechanism 64 (not shown). The X-axis tilting mechanism 63 and the Y-axis tilting mechanism 64 have the same structure. In the following, description will be given only on the X-axis tilting mechanism 63.

A tilting frame 65 is mounted on the rotation shaft 34, and a tilting motor 66 is provided on the tilting frame 65. A tilting screw 67 is rotatably provided on the tilting frame 65. The tilting screw 67 runs in parallel to the rotation shaft 34. One end (a lower end in the figure) is protruded, and a tilting driven gear 68 is engaged with the lower end. The tilting driven gear 68 is geared with a tilting driving gear 69 mounted on an output shaft of the tilting motor 66.

A tilting member 71 is screwed with the tilting screw 67 via thread. The tilting member 71 is slidably engaged with a guide (not shown) provided on the tilting frame 65 and the tilting member 71 is prevented from turning. On the tilting member 71, an engaging pin 72 is protruded. The engaging pin 72 and the engaging pin 60 are touched to the tilting member 71. The engaging pin 60 and the engaging pin 72 are pressed against each other by a spring (not shown) so that both pins are not separated from each other, and the engaging pin 60 and the engaging pin 72 are designed to be slidable with respect to each other.

Figure 3A:
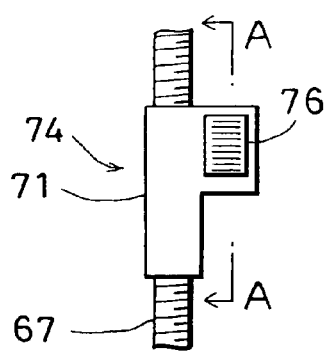
FIG. 3(A) is a front view.
Figure 3B:
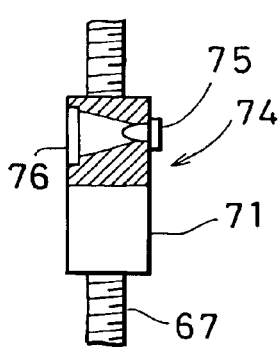
FIG. 3(B) is an arrow diagram along the line A-A in FIG. 3(A)

Between the tilting member 71 and the tilting frame 65, a linear sensor 74 is provided as shown in FIG. 3. A light emitting source 75 such as light emitting diode is mounted on the tilting member 71 and a linear scale 76 facing to the light emitting source 75 are mounted on the tilting member 71. On the linear scale 76, a cyclically changing scale (absolute pattern) is marked. The light emitted from the light emitting source 75 is projected and passes through the linear scale 76. On the tilting frame 65, a position detector 77 is mounted at a position opposite to the tilting member 71. The position detector 77 detects a light, which has passed through the linear scale 76. The position detector 77 is preferable a pattern detecting element, e.g. a CCD sensor, which can detect a cyclically changing pattern of the linear scale 76. The linear scale 76, the position detector 77, etc. make up together an absolute linear encoder.

The linear sensor 74 is enable to achieve high resolution and high accuracy by detecting the scale and cyclic change. An output signal of the linear scale 76 matches a tilt angle of the body tube 44 with respect to the rotation shaft 34. The linear sensor 74 can detect a reference position and also can detect an angle (an absolute angle) from the reference position.

The laser surveying instrument 20 is installed on a horizontal plane. With the optical axis 50 in vertical position, a position is detected, and the position detected by the position detector 77 is set as a reference position.

Although it is not shown in the figure, another tilting arm 59 is also connected with the Y-axis tilting mechanism 64 with the same structure.

Now, description will be given on the tilt setting unit 27.

An upper arm 78 is extended in horizontal direction from an upper position of the semi-spherical unit 45 of the body tube 44, and a lower arm 79 is extended in parallel to the upper arm 78 from a lower end of the body tube 44. The tilt setting unit 27 is provided between the lower arm 79 and the upper arm 78.

On the lower arm 79, a tilt setting motor 81 is provided, and a tilt setting screw 82 is rotatably provided. The tilt setting screw 82 runs in parallel to the optical axis 50. One end (a lower end in the figure) is protruded, and a tilt setting driven gear 83 is engaged with the lower end. The tilt setting driven gear 83 is geared with a tilt setting driving gear 84 mounted on an output shaft of the tilt setting motor 81.

A tilt setting member 85 is screwed with the tilt setting screw 82, and the tilt setting member 85 is slidably engaged with a guide (not shown), which is provided between the upper arm 78 and the lower arm 79, and the tilt setting member 85 is prevented from turning. An engaging pin 86 is protruded on the tilt setting member 85.

A tilt setting arm 88 is pivotally attached at a predetermined position of the lower half of the laser projector 23, and the tilt setting arm 88 can be rotated freely around the center line, which perpendicularly crosses the optical axis 50. At a forward end of the tilt setting arm 88, an engaging pin 89 is protruded. The engaging pin 89 is touched to the engaging pin 86. The engaging pin 86 and the engaging pin 89 are pressed against each other by a spring (not shown) so that both pins are not separated from each other, and the engaging pin 89 and the engaging pin 86 are slidable with respect to each other. The axis of the tilt setting arm 88 and the axis of the tilting arm 58 and the engaging pin 60 are preferably arranged on the same plane.

At a forward end of the tilt setting arm 88, a tilt setting protractor 91 is provided, which is designed in arc shape and coaxial with rotation center of the tilt setting arm 88, and an X-axis tilt sensor 92 and a Y-axis tilt sensor 93 are mounted on the tilt setting arm 88. On the rotation shaft 34, a window 94 is formed in such manner that the window 94 does not interfere with the tilt setting arm 88, the X-axis tilt sensor 92, and Y-axis tilt sensor 93.

A setting angle detector 95 is provided in parallel to the tilt setting protractor 91, and the setting angle detector 95 is so arranged that the setting angle detector 95 receives a light emitted from a light source (not shown) through the tilt setting protractor 91.

Angular scale is marked on the tilt setting protractor 91, and angular scale is designed as an absolute pattern, which is changed with a predetermined cycle. By detecting the scale and the cyclic change, the setting angle detector 95 can perform detection with high resolution and high accuracy. As the setting angle detector 95, a pattern detecting element such as CCD element is used, which can detect light and also can recognize pattern.

The setting angle detector 95 can detect the reference position. A position, where the X-axis tilt sensor 92 and the Y-axis tilt sensor 93 indicate horizontal direction in the condition that the optical axis 50 is in vertical direction, is set as the reference position.

The angular scale of the tilt setting protractor 91 is designed to indicate an angle from the reference position, and the setting angle detector 95 can detect an angle from the reference position (absolute angle).

Figure 2:
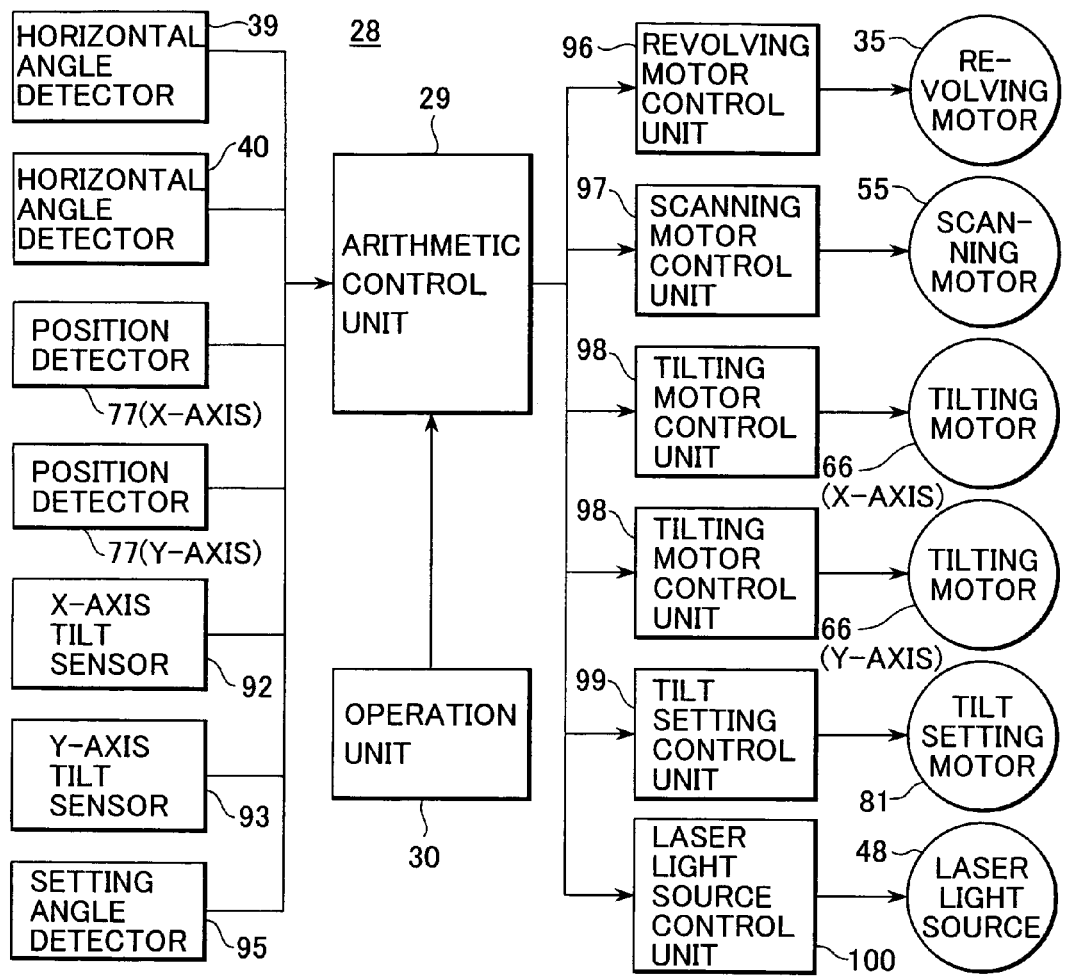
FIG. 2 is a block diagram to show a control system of the embodiment of the present invention.

FIG. 2 shows the control unit 28. Detection results from the horizontal angle detectors 39 and 40, the position detector 77, the X-axis tilt sensor 92, the Y-axis tilt sensor 93 and the setting angle detector 95 are sent to an arithmetic operation control unit 29. Based on the detection results from the horizontal angle detectors 39 and 40, the position detector 77, the X-axis tilt sensor 92, the Y-axis tilt sensor 93, and the setting angle detector 95, the arithmetic operation control unit 20 drives and controls the revolving motor 35 via a revolving motor control unit 96. The scanning motor 55 is driven and controlled via a scanning motor control unit 97. The tilting motor 66 (X-axis) and the tilting motor 66 (Y-axis) are driven and controlled via tilting motor control units 98 and 98. The tilt setting motor 81 is driven and controlled via a tilt setting control unit 99, and the laser light source 48 is driven and controlled via a laser light source control unit 100.

Description will be given below on operation.

First, description will be given on the setting of a tilt reference plane, in case that the laser surveying instrument 20 is installed on a horizontal plane and tilting is set in a predetermined direction. "The tilt setting in a predetermined direction" means composite tilting synthesized in case that tiltings in two directions are set (to be described later) and a direction of such composite tilting. In the present surveying instrument, the tilt setting mechanism is mono-axial, and it is necessary to direct in the direction of such composite tilting.

Here, it is assumed that a setting angle of the composite tilting is inputted in advance. The base 31 is installed on horizontal plane, and then the axis of the support shaft 32 is erected in vertical direction, and the rotation shaft 34 is rotated around the vertical axis. The tilt setting motor 81 is driven, and the tilt setting arm 88 is set to the reference position. The reference position of the tilt setting arm 88 can be set by detecting the reference position of the tilt setting protractor 91 by using the setting angle detector 95.

At the reference position of the tilt setting arm 88, i.e. in the condition that the tilt setting arm 88 perpendicularly crosses the optical axis 50, the X-axis tilting mechanism 63 and the Y-axis tilting mechanism 64 (not shown) are driven. The body tube 44 is tilted via the tilting arms 58 and 59, and it is so arranged that the X-axis tilt sensor 92 and the Y-axis tilt sensor 93 detect horizontal direction, i.e. the laser projector 23 is set in vertical direction.

The tilt setting motor 81 is driven, and the tilt setting member 85 is moved in vertical direction via the tilt setting driving gear 84 and the tilt setting driven gear 83, and the tilt setting arm 88 is tilted via the engaging pin 86 and the tilt setting member 85. Tilt angle of the tilt setting arm 88 is detected by the setting angle detector 95, and an angle detected by the setting angle detector 95 is aligned with the setting angle.

By driving the X-axis tilting mechanism 63 connected with the tilting arm 58 arranged on the same plane as the tilt setting arm 88, the tilting arm 58 is tilted.

The tilting motor 66 is driven, and the tilting screw 67 is rotated via the tilt driving gear 69 and the tilt driven gear 68. The tilting member 71 is moved in vertical direction. By the displacement of the tilting member 71, the tilting arm 58, i.e. the body tube 44, is tilted via the engaging pin 72 and engaging pin 60.

The tilt setting unit 27 is also tilted integrally with the tilting of the body tube 44. The result of tilt detection from the X-axis tilt sensor 92 and the Y-axis tilt sensor 93 is sent to the arithmetic operation control unit 29 by feedback, and the tilting motor 66 is driven so that the X-axis tilt sensor 92 detects the horizontal direction.

When the X-axis tilt sensor 92 detects the horizontal direction, the laser projector 23 is tilted at a setting angle.

By driving the revolving motor 35, the rotation shaft 34 is rotated via the revolving driving gear 36 and the revolving driven gear 37, and the axis of the tilting arm 58 is directed in tilting direction, and the tilting direction is set.

A light is emitted from the laser light source 48, and the scanning motor 55 is driven. By rotating the rotary irradiation unit 24, the laser beam is projected within the preset tilted plane by rotary irradiation, and a tilt reference plane as desired is formed.

Next, description will be given on a case where the laser surveying instrument 20 is installed on a non-horizontal plane and a case that a composite tilt reference plane is set. Here, "composite tilt plane" means a case where there are tiltings in two directions. The composite tilt plane is a plane tilted further with respect to a predetermined tilted plane. For example, the composite tilt plane is just like a slope and a water drain ditch running on a slope. The water drain ditch has the same tilting as that of the slope, and the tilting of the water drain ditch is tilted in perpendicular direction more than the tilting of the slope. That is to say, the water drain ditch has a composite tilting plane tilted in two directions. The laser surveying instrument 20 forms a composite tilt reference plane just as in the case where a water drain ditch is constructed.

The present surveying instrument is a mechanism with mono-axial tilting mechanism on a horizontal rotation shaft. In the case that the laser surveying instrument 20 is installed on a plane, which is not horizontal, the rotation center of the rotation shaft 34 is tilted with respect to the vertical line. When the rotation shaft 34 is rotated under this condition, tilt angle of the rotation shaft 34 is added to or subtracted from the present tilting direction, and this causes an error in the preset tilting direction. In the laser surveying instrument 20, the error in the preset set tilting direction is corrected. In the preset tilting direction as corrected, tilting is set by the tilting mechanism so that the tilt sensor indicates zero.

Figure 4:
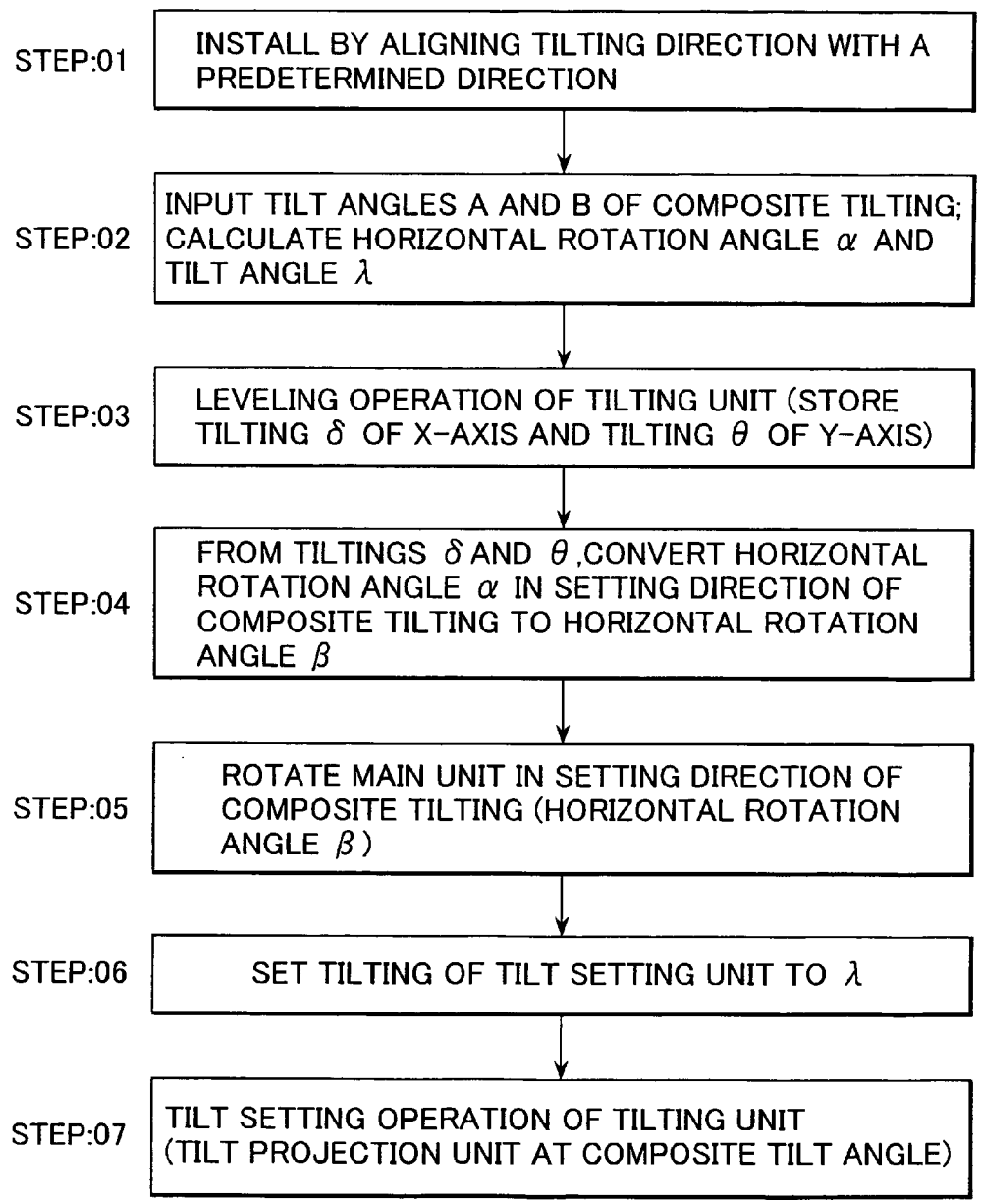
FIG. 4 is a flow chart of operation of the embodiment of the present invention.
Figure 5:
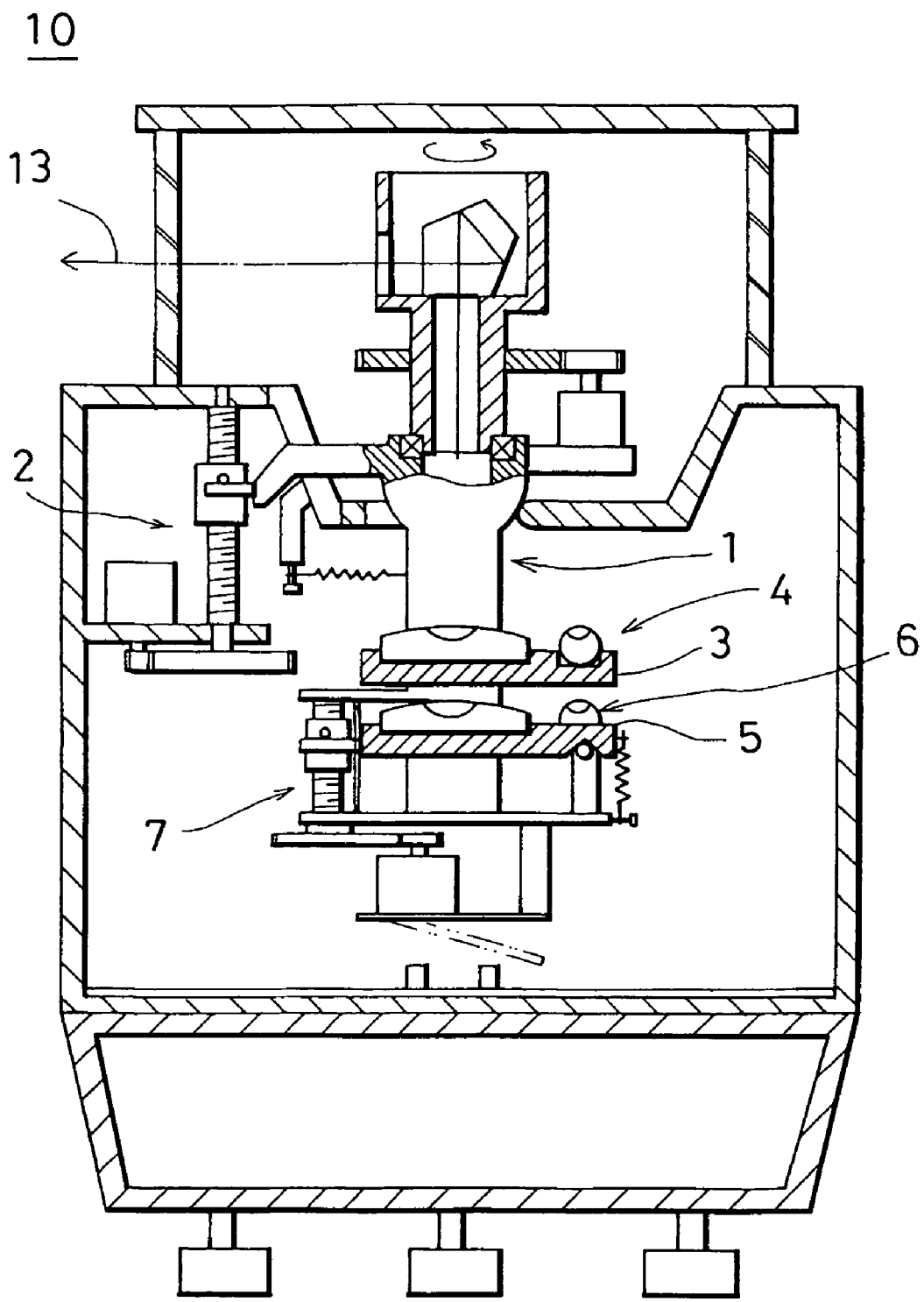
FIG. 5 is a cross-sectional view of a conventional type laser surveying instrument.
Figure 6:
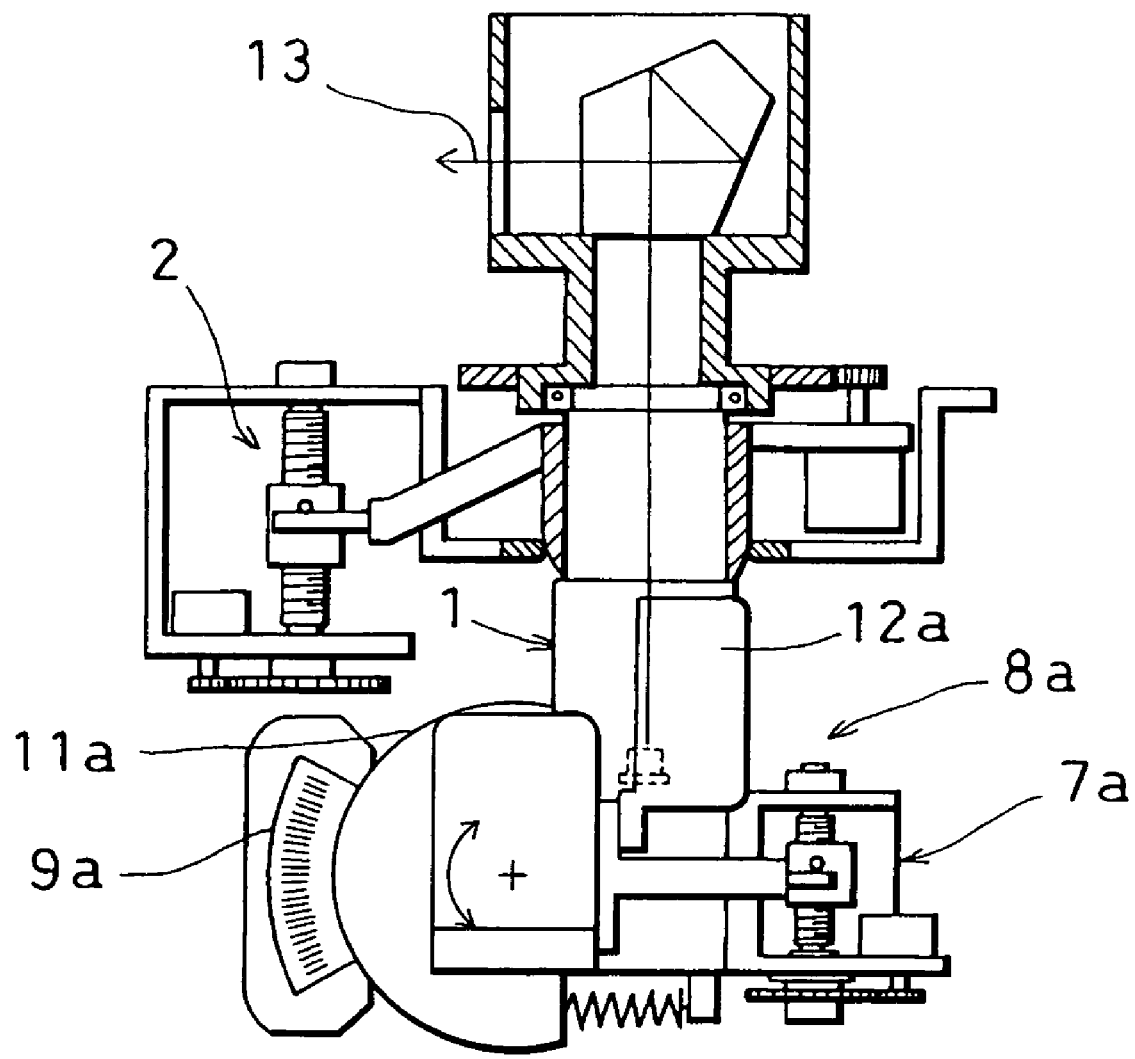
FIG. 6 is a front view of an essential portion of cross-section of another conventional example.

Now, description will be given on setting operation on the composite tilt reference plane in a case where the laser surveying instrument 20 is installed on a tilted plane by referring to FIG. 4.

The laser surveying instrument 20 is installed by aligning the laser surveying instrument 20 in one of the tilting directions of the composite tilting (e.g. in a direction of the slope) (Step: 01).

In the operation to install the laser surveying instrument 20, the direction is aligned with the coarse sight 103 by collimating an object placed at a predetermined position, for instance. In the condition that the laser suveying instrument 20 is set in tilting direction, it is the condition where the tilting arm 58 (X-axis) is aligned with the tilting direction. Under the condition where the laser surveying instrument 20 is set in the tilting direction, rotation angle in horizontal direction of the tilting arm 58 with respect to the base unit 21 is detected by the horizontal angle detectors 39 and 40. The detected rotation angle is inputted as a reference position to the arithmetic operation control unit 29 and is stored.

Tilt angles A and B of the composite tilting are inputted (Step 02). For instance, the symbol A represents a tilt angle of a slope, and B represents a tilt angle of the water drain ditch. Composite tilt angle on composite tilt reference plane tilted in two directions is calculated as a tilt angle $\lambda$ with respect to horizontal direction and calculated as a horizontal rotation angle $\alpha$ from the reference position.

Leveling is performed by the tilting unit 26 so that the laser projector 23 is set in vertical direction (Step 03).

In this case, a value detected by the setting angle detector 95 is the reference position. By driving the tilting motors 66 of the X-axis tilting mechanism 63 and the Y-axis tilting mechanism 64, leveling is performed so that the X-axis tilt sensor 92 and the Y-axis tilt sensor 93 detect horizontal direction respectively. Under this condition, the optical axis 50 is in vertical condition, and the laser beam projected from the rotary irradiation unit 24 forms a horizontal reference plane.

Under the condition where the optical axis 50 is in vertical direction, the position detectors 77 (X-axis) and 77 (Y-axis) detect angles. The detection results are inputted to the arithmetic operation control unit 29 and are stored. The values detected by the position detectors 77 and 77 are a tilt angle δ of X-axis and a tilt angle θ of Y-axis with respect to the plane, on which the laser surveying instrument 20 is installed.

Based on the tilt angle δ and the tilt angle θ, the horizontal rotation angle α is converted to a horizontal rotation angle β in the corrected preset tilting direction (Step 04).

For instance, when it is assumed that the tilting direction is α (horizontal rotation angle) with the tilting direction as the reference, the rotation angle component, in horizontal direction on the tilted plane, includes an error of γ compared with the case where the vertical axis is rotated by an angle of α around the center. Therefore, to correctly set the tilting direction of the composite gradient, it should be rotated from the reference position around the axis so that β=α+γ.

If it is supposed that the tilt angle of X-axis is δ, the tilt angle of Y-axis is θ, and horizontal rotation angle to be set is α, then the following relation exists with respect to actual horizontal rotation angle β.

$$\beta = \cos^{-1}(\cos[\sin^{-1}(\sin \alpha \times \cos \theta)] \times \cos \delta)$$

By driving the revolving motor 35, the rotating unit 22 is rotated by an angle of β in the tilting direction so that X-axis (axis of the tilting arm 58) is to be in composite tilting direction (Step 05).

The tilt setting unit 27 is driven, and the tilt setting arm 88 is tilted by driving the tilt setting motor 81 so that the reading scale on the tilt setting protractor 91 is to be at an angle in reverse direction of the tilt angle λ (i.e. −λ) (Step 06).

By driving the tilting motors 66 (X-axis) and 66 (Y-axis), the tilting arms 58 and 59 are tilted so that the horizontal tilt sensor 92 and the Y-axis tilt sensor 93 detect horizontal position. Under the condition that the horizontal tilt sensor 92 and the Y-axis tilt sensor 93 detect the horizontal position, the reference plane formed by rotary irradiation of the laser beam from the laser projector 23 is tilted at the preset tilt angle λ with respect to the horizontal direction, and the tilting direction of the reference plane is set to α. A composite tilting is set where tilt angles of X-axis and Y-axis at the reference position are indicated by A and B.

In a structure with the tilt setting unit 27 in one direction, the tilt reference plane can be set in arbitrary tilting direction and at arbitrary tilt angle.

Instead of the linear sensor 74, it may be designed in such manner that an encoder is provided on the tilting motor 66 or on the tilting screw 67, and the rotation angle is detected and the rotation angle is converted to the tilt angle of the tilting arm 58. Also, it may be designed in such manner that an encoder is provided on the revolving motor 35 instead of the horizontal angle protractor 38 and the horizontal angle detectors 39 and 40 so that the rotation angle of the rotating unit 22 can be detected. Further, it may be designed in such manner that an encoder is provided on the tilt setting motor 81 instead of the tilt setting protractor 91 and the setting angle detector 95 so that the tilt angle of the tilt setting arm 88 can be detected.

As described above, the angle is detected by the tilt setting protractor 91, the setting angle detector 95, the position detector 77, and the linear scale 76. Then, no displacement over time occurs as in the case of positioning based on a mechanical stopper, and high accuracy and good repeatability can be ensured for long time.

The tilt reference plane, which is tilted 2-dimensionally, can be set by a set of tilt setting units 27, and this contributes to simpler design of the mechanism.

What is claimed is:

1. A laser surveying instrument, comprising a laser projector for projecting a laser beam by rotary irradiation to form a reference plane and designed as tiltable, a tilting unit for tilting said laser projector so as to tilt the reference plane, a rotating unit for integrally rotating said tilting unit and said laser projector in a horizontal direction so as to change a tilting direction of the reference plane, a tilt setting unit for tilting said laser projector with respect to said rotating unit and for setting a target tilt angle, a tilt angle detector for detecting tilting of said laser projector, tilt sensors provided on said tilt setting unit in two directions perpendicularly crossing and for detecting horizontal position, a horizontal angle detector for detecting a horizontal rotation angle of said rotating unit, and an arithmetic control unit for controlling a rotation angle of said rotating unit based on detection results of said tilt sensors and based on detection results of said horizontal angle detector.

2. A laser surveying instrument according to claim 1, wherein said tilting unit comprises an X-direction tilting unit and a Y-direction tilting unit running perpendicularly to each other, wherein said tilting unit levels said laser projector in vertical position by leveling said laser projector in such manner that said tilt sensors detect horizontal position in the condition that said tilt setting unit is at a reference position.

3. A laser surveying instrument according to claim 1, wherein tilting arms are extended in horizontal direction from said laser projector, said tilting unit tilts said laser projector via said tilting arms, and said tilt angle detector detects tilting of said tilting arms.

4. A laser surveying instrument according to claim 3, wherein said tilt angle detector comprises an absolute pattern moving up or down to follow the movement of said tilting arms and comprises a position detector fixedly provided to face to said absolute pattern, and a tilt angle from the reference position of said tilting arms is detected by detecting said absolute pattern by said position detector.

* * * * *